United States Patent
Liu et al.

(10) Patent No.: US 6,865,714 B1
(45) Date of Patent: Mar. 8, 2005

(54) AUTOMATIC GENERATION OF CARD-BASED PRESENTATION DOCUMENTS FROM MULTIMEDIA DATA

(75) Inventors: Peiya Liu, East Brunswick, NJ (US); Liang-Hua Hsu, Robbinsville, NJ (US); Young Francis Day, Plainsboro, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 09/401,383

(22) Filed: Sep. 22, 1999

(51) Int. Cl.[7] .................. G06F 15/00; G06F 17/00; G06F 17/21
(52) U.S. Cl. .............. 715/523; 715/501.1; 715/526; 715/506; 715/505; 715/507; 715/500.1; 715/517
(58) Field of Search .............. 715/523, 501.1, 715/526, 506, 505, 507, 500.1, 517

(56) References Cited

U.S. PATENT DOCUMENTS

| | | | | |
|---|---|---|---|---|
| 5,299,304 A | * | 3/1994 | Williams et al. | 707/523 |
| 5,617,528 A | * | 4/1997 | Stechmann et al. | 707/517 |
| 5,860,073 A | * | 1/1999 | Ferrel et al. | 715/522 |
| 5,907,837 A | * | 5/1999 | Ferrel et al. | 707/3 |
| 5,995,985 A | * | 11/1999 | Cai | 707/507 |
| 6,009,436 A | * | 12/1999 | Motoyama et al. | 707/102 |
| 6,026,417 A | * | 2/2000 | Ross et al. | 707/517 |
| 6,199,079 B1 | * | 3/2001 | Gupta et al. | 707/507 |
| 6,321,244 B1 | * | 11/2001 | Liu et al. | 715/523 |
| 6,374,271 B1 | * | 4/2002 | Shimizu et al. | 707/501.1 |
| 6,424,978 B1 | * | 7/2002 | Liu et al. | 715/501.1 |
| 6,487,566 B1 | * | 11/2002 | Sundaresan | 707/513 |
| 6,589,291 B1 | * | 7/2003 | Boag et al. | 715/513 |

FOREIGN PATENT DOCUMENTS

| | | |
|---|---|---|
| JP | 11143874 | 5/1999 |
| WO | WO9746957 | 12/1997 |

OTHER PUBLICATIONS

Van Ossenbruggen J et al: "Requirements for multimedia markup and style sheets on the World Wide Web" Computer Networks and ISDN Systems, North Holland Publishing. Amerstdam, NL, vol. 30, No. 1–7, Apr. 1, 1998, pp. 694–696, xp004121458 ISSN: 0169–7552 abstract p. 694 –p. 695.

* cited by examiner

*Primary Examiner*—Joseph Feild
*Assistant Examiner*—Almari Yuan
(74) *Attorney, Agent, or Firm*—Donald B. Paschburg; F. Chau & Associates, LLC

(57) ABSTRACT

An automatic card-based presentation generation system programmatically creates card-based presentation documents from source documents by transforming a card layout style specification into presentation specifications which at run-time, are used to generate formatting object descriptions. The formatting object descriptions are then used to actually create card-based presentation documents. The invention includes a presentation style transformer and a card-based presentation generator. The presentation style transformer takes a card layout style specification (CLSS) and a card display schema (CDS) and transforms them into card-based presentation specifications (CPS). The card-based presentation generator takes the card-based presentation specifications and a card-based document content to create formatting object descriptions.

12 Claims, 17 Drawing Sheets

FIG. 2

```
<CardLayoutStyle Name=name...>
   <Options size=card_size...>...</Options>
   ...
   <BackgroundList>
    <Background name=name Func=function_name>
     <object properety=...></>
     ...
    <Background>
    <Background name=name Func=function_name>
     <object property=...></>
     ...
    <Background>
    ...
   </BackgroundList>...
   <ForegroundList>
     <Foreground name=name Func=function_name>
      <object property=...></>
      ...
     </Foreground>
     <Foreground name=name Func=function_name>
      <object property=...></>
      ...
     <Foreground>
     ...
   <ForegroundList>
   <CardSeq name=name Context=context Type=type Content=content>
     <Background StyleRef=background_name>
   <CardSeq>
   <CardSeq name=name Context=context Type-type Content=content>
     <Background StyleRef=background_name>
   </CardSeq>
   ...
   <Card name=name Context=context Type=type Content=content>
     <Foreground StyleRef=background_name></>
   </Card>
   <Card name=name Context=context Type=type Content=content>
     <Foreground StyleRef=background_name></>
   </Card>
   ...
<CardLayoutStyle>
```

FIG. 3

```
<CardLayoutStyle Name=name...>
  <Options size=card_size...>...</Options>
  ...
  <BackgroundList>
    <Background name=name Func=function_name>
      <object property=...></>
      ...
    </Background>
    <Background name=name Func=function_name>
      <object property=...></>
      ...
    </Background>
    ...
  </BackgroundList>...
  <ForegroundList>
    <Forground name="TextByGfxForeground" Func="TextByGfxForeground">
      <Object Name="TextByGfxTitle"
              Coords="180,1395,1150,1305"
              Type="Field"
              Func-"TitleText"
              Context="Card,CardX,CardTitle"
              FontSize="15"
              FontStyle="Bold"
              FontColor="blue"
              Content="CardTitle"></>

<Object Name="GfxContent"
              Coords-"357 94 881 693"
              Type="Graphics"
              Func="GfxContent"
              Context="Card,CardX,AnyDocX,Figure,Graphic"
              Content="Graphic"
              AIU="Card,CardX,AnyDocX,Figure,AIUDoc,ROI"></>
      ...
    </Foreground>
    ...
  </ForegroundList>
  <CardSeq name="TextByGfxSeq Type="TextByGfx"
           Context="PlantLevel,CardSeq" Content="">
    <Background StyleRef="NormalBackground">
  </CardSeq>
  ...
  <Card name="TextByGfxCard" Type="TextByGfx"
        Context="PlantLevel,CardSeq,Card"Content="">
    <Foreground StyleRef="TextByGfxForeground"></>
  </Card>
  ...
<CardLayoutStyle>
```

FIG. 4

```
<MACRO_Declaration>
  <ObjectGroup name="project_resource">
    MACRO_Resource(stylename, type, filename)</>
    MACRO_Resource(stylename, type, filename)</>
    ...
  </ObjectGroup>
  MACRO_name(stylename, parameters)</>
  MACRO_name(stylename, parameters)</>
  ...
</MACRO_Declaration>
<ContentMapping>
  <ElementRule Context=doc_tags>
    <DefineVar name=...>
    <DefineVar name=...>
    ...
  <CaseExpr key=...>
  <CaseClause matchvalue=...>
  <AddObject otype=...stylename=...>
  <ProcessGrove command=...></>
  ...
  <AddGroup groupname=...></>
  ...
  </AddObject>
  </CaseClause>

<CaseClause matchvalue=...>
  <AddObject otype=...stylename=...>
  <ProcessGrove command=...></>
  ...
  <AddGroup groupname=...></>
  ...
  </AddObject>
  </CaseClause>
  </CaseExpr>
  </ElementRule>

<ElementRule...>...</>
  ...
</ContentMapping>
```

FIG. 5

```
<MACRO_Declaration>
  ...
  ...
  MACRO_TitleField(TextByGfxTitle, "180,1395,1150,1305,"$CardTitle_RTF$, 15", "bold", "blue")
  ...
</MACRO_Declaration>
<ContentMapping>
  ...
  <ElementRule context="(Card CardX)">
  <ProcessGrove
       command="process-matching-children CardTitle">
  <ProcessGrove
       command="process-matching-children ANYDOCX">
  </ElementRule>

<ElementRule context=(Card CardX CardTitle)">
  <DefineVar name="$CardTitle_RTF"forvalue="(RTF-TitleGen(current node))"></>

<CaseExpr key="(CardType(current-node))">
      <CaseClause matchvalue="GfxonlyCard">
        <AddObject otype="Field" stylename="GfxOnlyTitle"></>
      </CaseClause>
      <CaseClause matchvalue="TextByGfxtitle">
        <AddObject otype="Field" stylename="TextByGfxTitle"></>
      </CaseClause>
      <CaseClause matchvalue="else">
        <AddObject otype="Field" stylename="TextByGfxTitle"></>
      </CaseClause>
    </CaseExpr>
  </ElementRule>
  <ElementRulk>...</>
  ...
</ContentMapping>
```

FIG. 7

```
<DisplaySchema Objectype="Field" Name="TextByGfxTitle">
    <Argument name="StyleName" type="Required"
        AvailVule="#ANY_UNIQUE_NAME">
    <Argument name="vertices" type="Required"
        Availalue="#ANY_2POINTS">
    <Argument name="TitleRTF" type="Optional"
        DefaultValue=$CARDTitle_RTF$">
    <Argument name="FontSize" type="Optional"
        DefaultValue="15"AvailValue="#Number">
    <Argument name="Fontstyle" type="Optional"
        DefaultValue="Regular"AvailValue="Bold,Regular,Italic">
    <Argument name="FontColor" type="Optional"
        DefaultValue="Black"AvailValue="#Any_Color_Name or RGB Stroke">
</DisplaySchema>
```

FIG. 8

```
<DisplaySchema Objective=object_type Name=macro_name or varaiable_name>
    <Argument name=...type=...
        DefaultValue=...AvailValue=...>
    <Argument name=...type=...
        DefaultValue=...AvailValue=...>
    <Argument name=...type=...
        DefaultValue=...AvailValue=...>
        ...
</DisplaySchema>
```

FIG. 9

```
<DisplaySchema Objectype="DefineVar" Name="$CardTitle_RTF$">
    <Argument name="RTF-Gen" type="Required"
        AvailValue="#ANY-DSSSL-FUNC-NANME">
    <Argument name="context" type="Optional"
        DefaultValue="(Card Title)">
</DefaultSchema>
```

FIG. 10

```
<DisplaySchema Objective="Resource"MacroName="MACRO_Resource">
    <Argument name="Format" type="Optional"
        DefaultValue="icon"AvailValue="icon,bitmap,sharedscript,menubar">
    <Argument name="StyleName" type="Required"
        AvailVule="#ANY_UNIQUE_NAME">
    <Argument name="InstanceNAme" type="Optional"
        DefaultValue=""AvailValue="#ANY_STRING">
    <Argument name="FileName" type="Required"
        AvailValue="#ANY_STRINGr">
</DisplaySchema>
```

1. CardManual, PlantLevel, CardSeq
2. CardManual, PlantLevel, CardSeq, Card
3. CardManual, PlantLevel, CardSeq, Card, CardX, CardTitle
4. CardManual, PlantLevel, CardSeq, Card, CardX, AnyDocX
5. CardManual, PlantLevel, CardSeq, Card, CardX, AnyDocX, Figure, Graphic
6. CardManual, PlantLevel, CardSeq, Card, CardX, AnyDocX, Figure, AIUDoc, ROI

FIG. 14

(A) Transition Node: CardX
```
<ElementRule context="(Card CardX)">
<ProcessGrove
  command="process-matching-children CARDTITLE"></>
<ProcessGrove
  command="process-matching-children ANYDOCX"></>
<ElementRule>
```

(B) Content Node: CardTitle (See Figure 5)

(C) Content Transition Node: CardSeq
```
<ElementRule context="(PlantLevel CardSeq)">
<DefineVar name="$Page_currentObject$"
           strValue="(currentObjectGen (current-node))"> </>
<DefineVar ...> </>
...
<CaseExpr key="(cardSeqType (current-node))">
<CaseClause matchval="GfxOnly">
<AddObject otype=Background styleName="GfxOnlyBackground">
<ProcessGrove
  command="process-matching-children CARD"></>
</AddObject>
</CaseClause>

<CaseClause matchval="TextByGfx">
<AddObject otype=Background styleName="NormalBackground">
<AddObject otype=Button styleName="Top"></>
<AddObject otype=Button styleName="First"></>
<AddObject otype=Button styleName="Previous"></>
<AddObject otype=Button styleName="Next"></>
<AddObject otype=Button styleName="Last"></>
<AddObject otype=Button styleName="Audio"></>
<AddObject otype=Button styleName="Animate"></>
...
<ProcessGrove
  command="process-matching-children CARD"></>
</CaseClause>

</CaseClause matchval="else">
...
</CaseClause>

</CaseExpr>
</ElementRule>
```

FIG. 15

```
(D) ROOT NODE: CardManual
<ElementRule context="CardManual">
 <AddObject otype=CardManualLayout styleName="">
  <DefineVar name="$BookTOC$" strValue="(TOC-Gen (current-node))"> </>
  <AddObject otype=ToolBookManual styleName="IMIS_ToolBook">
   <AddGroup groupName="Project      _Resources"> </>
   <AddObject otype=MainViewer styleName="MainViewer">
    <ProcessGrove
      command="process-matching-children PLANTLEVEL"></>
    <AddGroup groupName="IMIS_MiscViewersContent"> </>
   </AddObject>
   <AddGroup groupName="IMIS_MiscViewers"> </>
  </AddObject>
 </AddObject>
</ElementRule>

(E) Associated Node: ROI
<ElementRule context="(Card CardX AnyDocX Figure AIUDoc ROI)">
<DefineVar name="$AiyName$"
           strValue="(getattr NAME (current-node))"> </>

<CaseExpr key="(cardtype (current-node))">

<CaseClause matchval="GfxOnly"> ...</CaseClause>
<CaseClause matchval="TextByGfx">
 <CaseExpr key="(ROI-TYPE (current-node))">
  <CaseClause matchval="polygon">
   <AddObject otype=Polygon styleName="GfxContent-AIU-Poly"></>
   </>
  <CaseClause matchval="callout"> ..</>
  <CaseClause matchval="NameCallout"> ..</>
   ...
 </CaseExpr>
</CaseClause>
<CaseClause matchval="else">
  <EmptySosofo>
</CaseClause>

</CaseExpr>
</ElementRule>
```

FIG. 17

```
(element(Card CardX CardTitle)
   (sosofo-append
      (makeFODfo FOtype:"DefineVar"
                 FOname:"$CardTitle_RTF$"
                 FOinstruction:(RTF-TitleGen(current Node)))
   (case(cardType(current Node)))
      (("GfxOnly")
         (makeFODfo Fotype: "StartTag"
                    FOname: "Field"
                    FOinstruction:(AttributeGen GfxOnlyTitle)))

(("TextByGfx")
         (makeFODfo FOtype: "StartTag"
                    FOname: "Field"
                    FOinstruction:(AttributeGen TextByGfxTitle)))

(else
         (makeFODfo FOtype: "StartTag"
                    FOname: "Field"
                    FOinstruction:(AttributeGen TextByGfxTitle)))
```

FIG. 18

```
(define (AttributeGen type)
(case type
 (("TextByGfxTitle")
  (string-append
   " FontSize=\"15\" "
   " FontStyle= \"bold\" "
   " FontColor=\"0,0,255\" "
   " RGBFILL=\"255,255,255\" "
   " TRANSPARENT=\"true\" "
   " VERTICES=\"180,1395,1150,1305\" "
   " RICHTEXT=\"$CardTitle_RTF$\" "
   " FONTFACE=\"Times New Roman\" "
   " ACTIVATED=\"true\" "
   " BASELINES=\"false\" "
   " BORDERSTYLE=\"none\" "
   " FIELDTYPE=\"wordWrap\" "
   " SCROLL=\"0\" "
   " SPACING=\"1\" "
   " INDENTS=\"0,0,0\" "
   " TABSPACING=\"360\" "
   " TABTYPE=\"left\" "
   " TEXTALIGNMENT=\"left\" "
   " NAME=\"TitleField\""))
 (("GfxOnlyTitle")
   ...)
 ...
)
(define (makeFODfo #; key FOtype FOname FOinstruction)
 (case FOtype
  (("StartTag")
   (make FOD-Instruction
        data: (string-append "<" FOname FOinstruction "> "</>" )))
  (("DefineVar")
   (make FOD-Instruction
        data: (string-append "<DefineVar name="FOname "value=" FOinstruction ">")))
  (("EndTag")
   (make FOD-instruction
        data: (string-append "</>")))
   ...
  (else
   (make FOD-instruction
        data: (string-append "newFlowObjecttype")))
```

FIG. 19

```
<CardFormattingBook property=...>
    <Resource property=...>...</Resource>
    <Resource property=...>...</Resource>
    ...
    <MainViewer property=...>
     <StartBkgnd property=...>
      <Object property=...>
      ...
     <StartPage property=...>...</StartPage>
     <NextPage property=...>
      <Field Name="TitleField"
             TextAlignment="left"
             TabType="left"
             TabSpacing="360"
             Scroll="0"
             FieldType="wordwrap"
             BorderStyle="none"
             BaseLines"false"
             Activated="true">
             Fontface="Time New Roman"
             Vertice="180,1395,1150,1305"
             Transparent="True"
             RichText=
                "(\rtf1\anai \deff5\deftab360\deflang1033
                (\fonttbl
                (\f1\froman\fcharset2\fprg2 Symbol;)
                (\f2\ftech Marlett;)
                (\f4\froman\fcharset0\fprg2 Times New Roman;)
                (\f5\fswiss\fcharset0\fprg2 Arial;)
                (\f10\fswiss\fcharset0\fprg2 System;))
                (\colortbl;\red0\green0\blue0,\red0\green0\blue255;
                \red255\green0\blue0;\red255\green255\blue255;)
                \pard\plain \f4\fs20 (\b\i\f5\fs36\of1 co2 Purge System 1)
                )"
             RGBFill="255,255,255"
             fontsize="15"
             fontStyle="bold"
             rgbStroke="0,0,255"
             >
     </NextPage>
     <NextPage property=...>...</NextPage>
     ...
    </StartBknd>
    <NextBkgnd property=...>...</NextBgrnd>
    ...
   </MainViewer>
   <Viewer property=...>...</Viewer>
   ...
</CardFormattingBook>
```

FIG. 20

```
<CardFormattingBook property=...>
    <Resource property=...>...</Resource>
    <Resource property=...>...</Resource>
    ...
    <MainViewer property=...>
      <StartBkgrnd property=...>
        <Object property=...>
        ...
        <StartPage property=...>
          <Object property=...>
          ...
        </StartPage>
        <NextPage property=...>
          <Object Property=...>
          ...
        </NextPage>
        <NextPage property=...>
          <Object property=...>
          ...
        </NextPage>
        ...
      </StartBkgnd>
      <NextBkgnd property=...>...</NextBkgnd>
      ...
    </MainViewer>
    <Viewer property=...>...</Viewer>
    <Viewer property=...>...</Viewer>
    ...
</CardFormattingBook>
```

AUTOMATIC GENERATION OF CARD-BASED PRESENTATION DOCUMENTS FROM MULTIMEDIA DATA

BACKGROUND OF THE INVENTION

1. Field of the Invention

The present invention relates to multimedia document presentations and more particularly to a system for automatically generating platform-independent formatting object descriptions from SGML documents and non-textual media sources which can then be used to create card-based multimedia presentation documents.

2. Description of the Prior Art

Traditionally, hypermedia presentations are interactively designed and manually created with hypermedia authoring tools. Various commercial hypermedia authoring tools adopt different interactive authoring paradigms but they are limited in supporting the automated generation of card-based presentation from existing multimedia document sources in large scale. The representative presentation authoring tools are summarized as follows.

PowerPoint from Microsoft is based on a structure-oriented model and supports hierarchical information content authoring in a 2D layout. Many commercial word processing tools follow this authoring model. Documents are often developed in terms of hierarchical structures such as book, pages or slides, sections, subsections, etc., and WYSWIG user interfaces are provided to support structure editing and issue formatting commands interactively.

Authorware from Macromedia and IconAuthor from AimTech are based on a flowchart model and use icons representing events such as audio or video, if-then functions, branching and hyperlinks in a linear progression like flowchart control. Content editors to assign real media files and properties to each icon could be used. This model provides high-level program control and global ordering of information presentation.

Director from Macromedia, based on a time-line model, displays media sequences as tracks and specializes in synchronizing events. It can be used to create high-level multimedia presentations.

Multimedia Toolbook from Asymetrix, based on an object-oriented model with scripting capability, provides more support of complex interaction behavior. Users can interactively enter document content (in multimedia objects) and define object properties including various formatting commands and scripts for object behavior. This authoring tool allows the user to get to a lower-level control of object and system behavior with script commands.

SUMMARY OF THE INVENTION

The present invention provides a new approach for automatic generation of card-based document presentation from multimedia data sources. An automatic card-based presentation generation system programmatically creates card-based presentation documents from source documents. In the prior art, the card-based document presentation is interactively created by authoring tools. However, if documents are in large scale and information content already exists in other forms (e.g., archive formats), the interactively authoring process for manually creating presentation forms from these existing documents becomes tedious and time-consuming. This invention includes an automated system for transforming a card layout style specification into presentation specifications which at run-time, are used to generate formatting object descriptions. The formatting object descriptions can then be used to actually create card-based presentation documents.

The present invention comprises a presentation style transformer and a card-based presentation generator for generating card-based Formatting Object Descriptions (FOD) from the Card Layout Style Specification (CLSS). The presentation style transformer takes the card layout style specification (CLSS) and the Card Display Schema (CDS) as input and transforms them into a Card-based Presentation Specification (CPS). CLSS is used to declaratively specify the layout of the card-based presentation. CDS is used to specify meta rules for presentation resources and for variable definitions. CPS is a procedural specification of overall card-based presentation characteristics including layout, resources and presentation procedures. The card-based presentation generator takes the card-based presentation specifications and card-based document content as input to create formatting object descriptions. The generator first uses a Presentation Construct Mapper for translating CPS constructs into constructs required by Card-Based DSSSL Style Specifications and then uses a Card-based DSSSL Processor to create a Card-Based Document Flow Object Tree. After that, the generator uses an FOD Converter to convert the flow object tree into formatting object descriptions.

BRIEF DESCRIPTION OF THE DRAWINGS

FIG. 2 illustrates the syntax of a card layout style specification.

FIG. 3 gives an example of a card layout style specification for CardTitle.

FIG. 4 illustrates the syntax of a generated card-based presentation specification.

FIG. 5 gives an example of a card-based presentation specification for CardTitle.

FIG. 7 illustrates a display schema for generating a TextbyGfxTitle resource declaration.

FIG. 8 illustrates a syntax of display schema for generating resource declarations or variable definitions.

FIG. 9 illustrates a display schema for generating content variable definitions.

FIG. 10 illustrates a display schema for generating all primitive resource declarations.

FIG. 14 illustrates examples of generated CPS for C, CT and T nodes.

FIG. 15 illustrates examples of generated CPS for R and A nodes.

FIG. 17 illustrates a generated rd-based DSSSL style for CardTitle.

FIG. 18 illustrates some card-based DSSSL style functions used for CardTitle.

FIG. 19 illustrates a CardTitle formatting object description.

FIG. 20 illustrates a general syntax of formatting object description.

DETAILED DESCRIPTION OF THE INVENTION

This patent application is related to copending U.S. patent application Ser. No. 09/401,382 entitled "A Generalized System for Automatically Hyperlinking Product Documents", filed on Sep. 22, 1999 and assigned to the same assignee as the present invention.

The present invention is an automatic card-based presentation generation system that programmatically generates card-based formatting object descriptions from large SGML textual documents and non-textual media sources. The formatting object descriptions can be used to automatically create card-based presentation document formats. The prior art of the presentation approach is based on interactive authoring tools for manually creating multimedia presentation. The interactive approach does not support creating large-scale presentation documents for industrial applications due to required human involvement in the authoring process.

Figure 1:
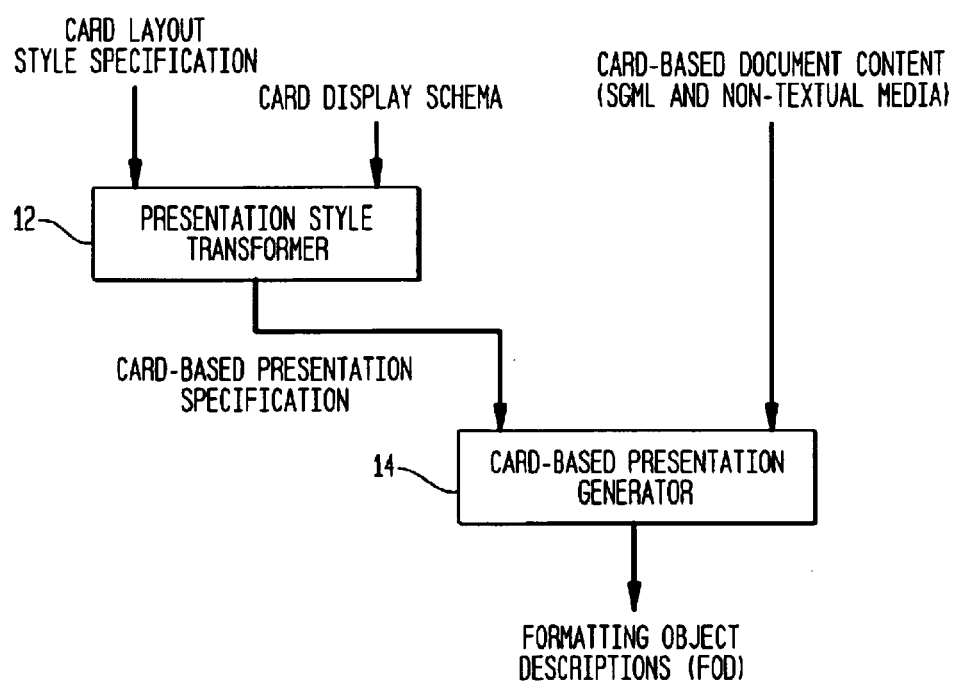
FIG. 1 illustrates a block diagram of the automatic card-based presentation generation system of the present invention.

The overall card-based presentation generation system is described in FIG. 1. The generation system comprises presentation style transformer 12 and card-based presentation generator 14. Presentation style transformer 12 receives a card layout style specification (CLSS), examples of which are shown in FIGS. 2 and 3. The CLSS language is described in U.S. patent application Ser. No. 08/984,734 filed on Dec. 4, 1997, entitled "Style Specifications For Systematically Creating Card-Based Hypermedia Manuals" and assigned to the same assignee as the present invention. Presentation style transformer 12 also receives a card display schema, an example of which is shown in FIG. 8. Presentation style transformer 12 generates a card-based presentation specification, shown in FIGS. 4 and 5, as output. The generated card-based presentation specification comprises two parts: MACRO resource declarations and procedural element mapping rules.

Card-based presentation generator 14 receives both, the card-based presentation specification and the SGML document content as inputs and generates platform-independent formatting object descriptions, FODs, as output. Formatting object descriptions are abstract descriptions of formatting directives of presentation documents. Once FODs are created, an automatic scripting process can be used to generate a card-based document presentation. The automatic scripting process is described in U.S. patent application Ser. No. 08/986,270 filed on Dec. 5, 1997, entitled "Formatting Card-Based Hypermedia Documents By Automatic Scripting" and assigned to the same assignee as the present invention.

Figure 6:
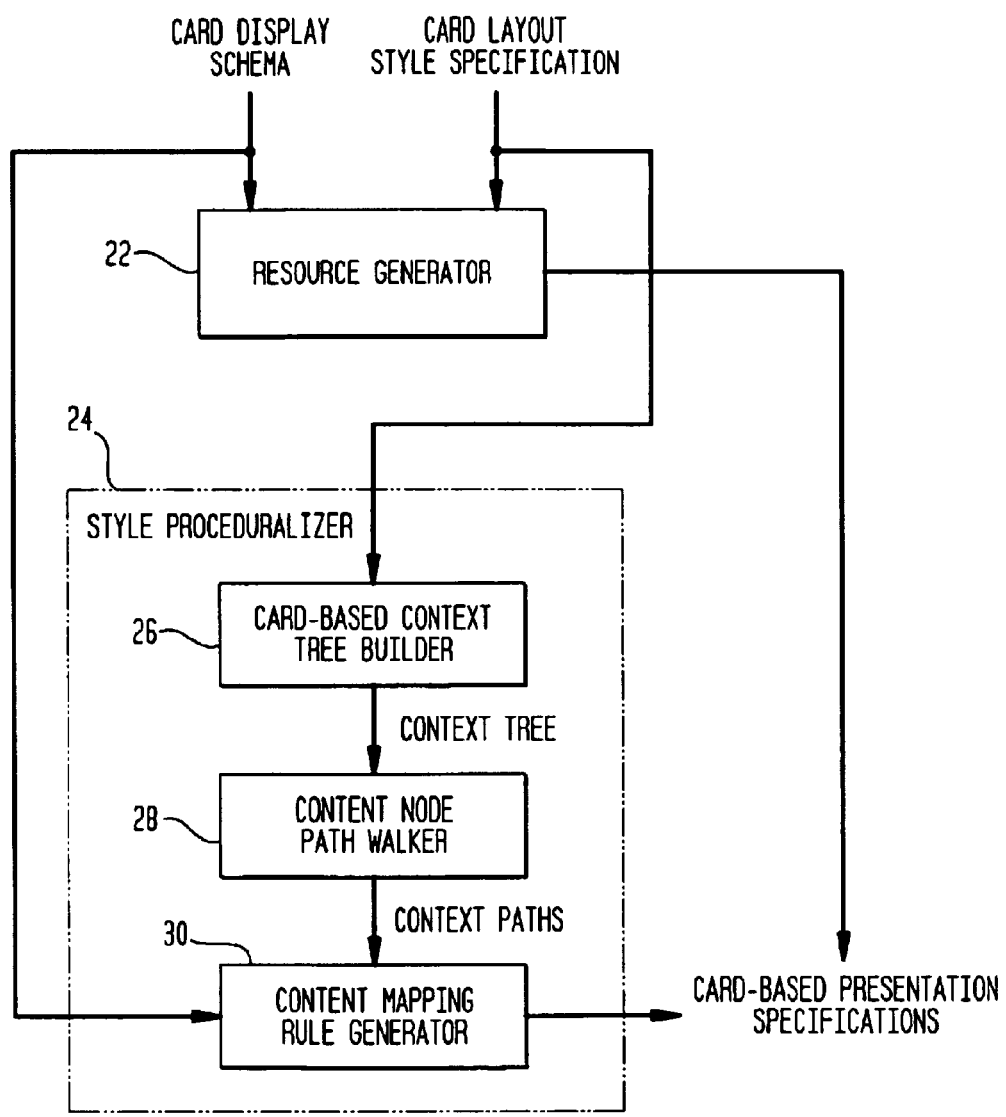
FIG. 6 illustrates a block diagram of a presentation style transformer for translating card layout style specifications into card-based presentation specifications based on display schema specifications.

Presentation style transformer, 12 of FIG. 1, is shown in greater detail in FIG. 6. The presentation style transformer comprises two major components:

resource generator 22 and style proceduralizer 24. Resource generator 22 is based on the card display schema and creates presentation resource declarations from the card-based layout style specification. Card presentation resource declarations include two types of resources: MACRO_Resource(stylename, parameters) for primitives and MACRO_name(stylename, parameters) for composites. The first argument of a MACRO resource declaration must be a stylename. Primitive resources are used for basic presentation object resource requirements of the target presentation platform. Composite resources can be defined in terms of primitive ones or other composite resources.

Resource generator 22 creates MACRO resource declarations by examining the objects inside background list and background list of card-based style specifications and the corresponding card display schema for the objects. As an example, the generated CardTitle MACRO resource declaration is shown in FIG. 5. This generation procedure is triggered by the TextByGfxTitle style layout specification shown in FIG. 3. The corresponding display schema, shown in FIG. 7, is used to guide the generator to create the TextByGfxTitle resource declaration with default values of their parameters. The MACRO_TitleField specifies the needed presentation objects and the variable $CardTitle_RTF$ whose value would be calculated by a predefined DSSSL function RTF-TitleGen from source document content at run-time.

The display schema syntax is shown in FIG. 8. It can be used to guide the generator for both creating resource declarations in the <MACRO Declaration> part and variable definitions in the <ContentMapping> part of the card-based presentation specification. Display schema for generating a variable definition of $CardTitle_RTF$ is done by style proceduralizer 24, shown in FIG. 9. Display schema for generating all primitive resource declarations is shown in FIG. 10.

Style proceduralizer 24, in FIG. 6, comprises three components: context tree builder 26, content node path walker 28 and content mapping rule generator 30. Context tree builder 26 creates a context tree for rule generator 30 to create content mapping rules along content node paths in the tree. Style proceduralizer 24 translates a declarative card layout style specification into procedural card content mapping rules. For example, CardTitle element content mapping is shown in FIG. 5. The first element mapping rule procedurally specifies the following things: Any document content with tag CardTitle or ANYDOCX under document tag CARDX which is under tag CARD will use an element rule with matched context tags for creating formatting object descriptions. Since the second element rule matches the context tags (Card, CardX, CardTitle), it will be invoked for further specifying how to create formatting object descriptions for CardTitle. The second rule basically specifies which types of formatting objects are created by using a stylename attribute value under a different cardtype.

Figures 11, 12:
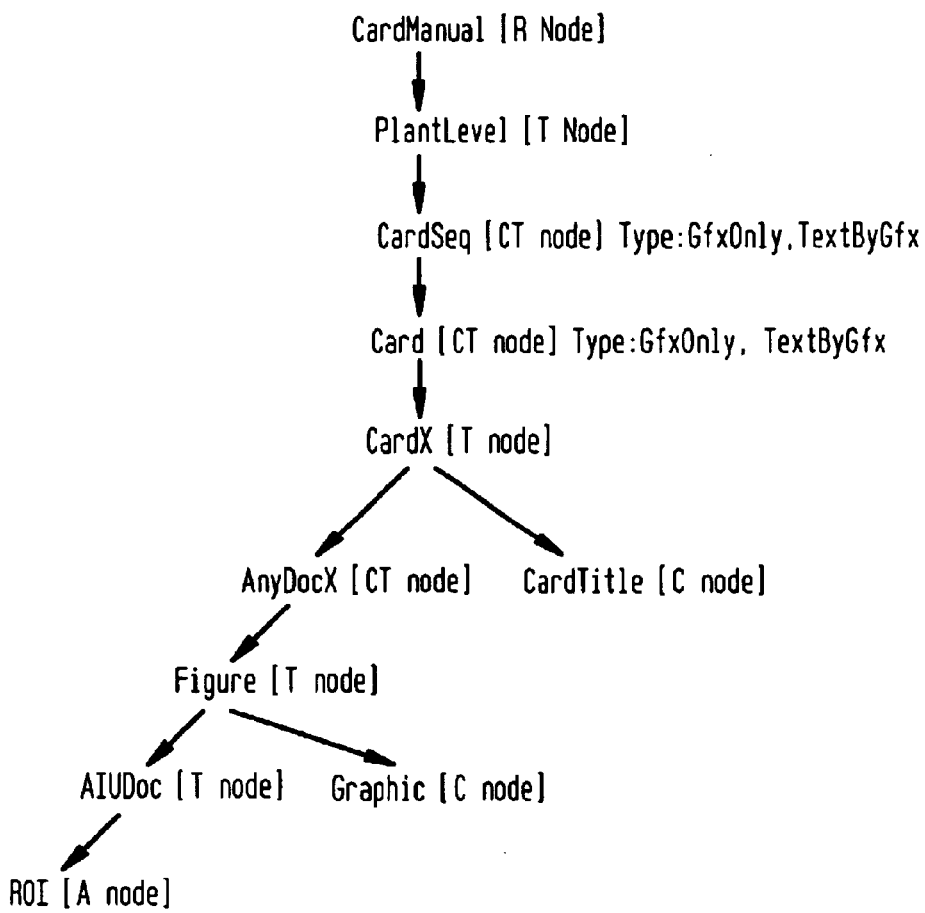
FIG. 11 illustrates a card-based context tree.
FIG. 12 illustrates card-based context paths.

Context tree builder 26 takes all context information in the card layout style specifications as input and constructs a context tree as output by examining and ordering all context tags appearing in the context and AIU attribute values in the layout specifications, by grouping the same context specification into one with type differences, and by marking context tags into the following categories: R (root node), C (content node) for both being a leaf node of context tree and the last element of some context attribute value, T (transition node) for both being a non-leaf node and non-content node, CT (content/transition node) for both being a non-leaf node of context tree and the last element of some context attribute value, and A (associated node) from attribute AIU values for the context of associated AIU in graphics. The context tree is designed to capture content mapping rule context for making an efficient generation process of procedural rule mappings in CPS. As an example, a context tree is shown in FIG. 11.

Content node path walker 28 takes the context tree as an input and finds all context paths as the output. The context paths are defined to be the shortest paths from the root node to each C, CT and A nodes as shown in FIG. 12.

Figure 13:
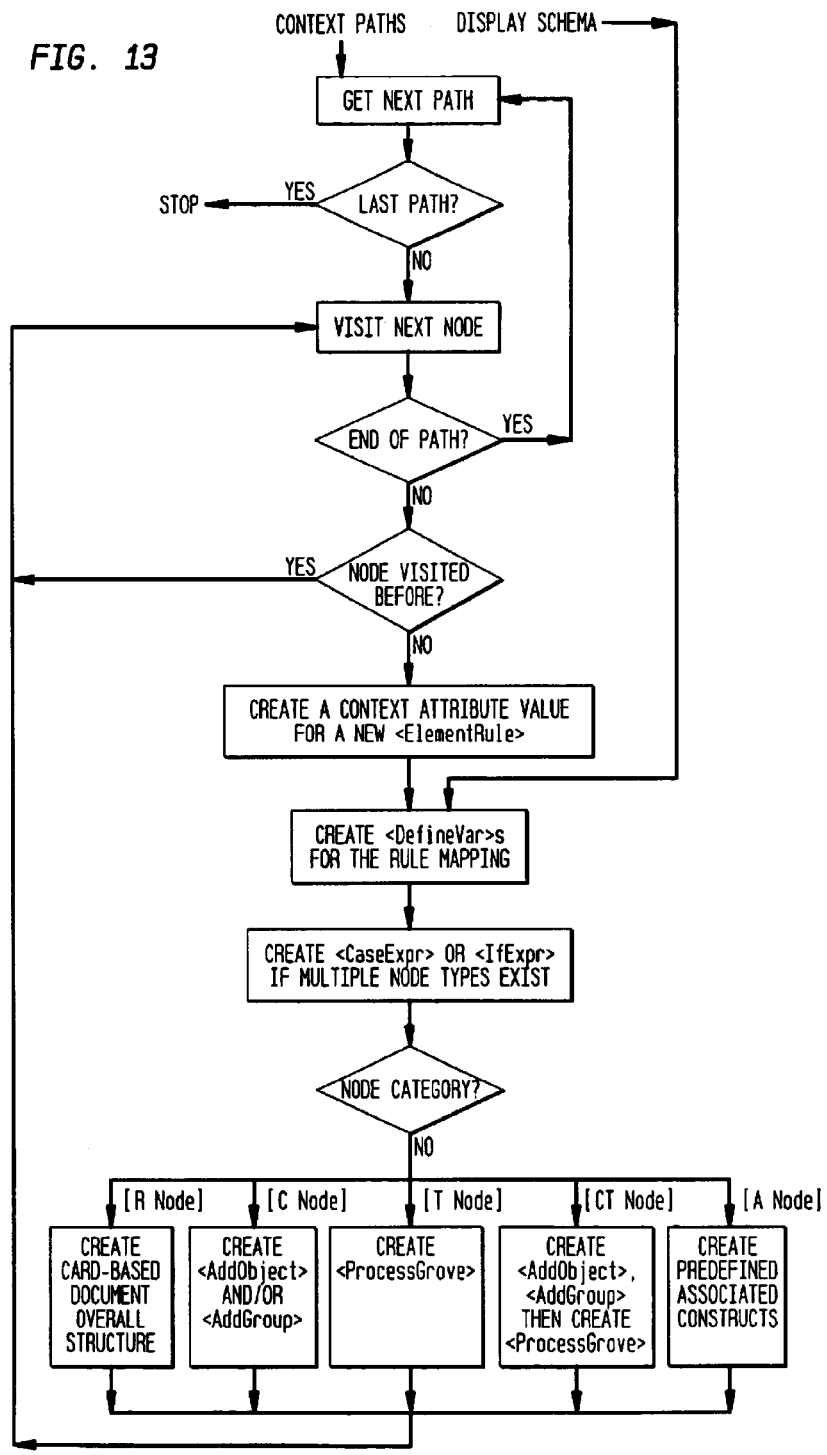
FIG. 13 illustrates a flow chart of the content mapping rule generation process.

Content mapping rule generator 30 uses categories and types of nodes to generate constructs of content mapping rules. The detailed process in shown in FIG. 13. Examples are shown in FIGS. 14 and 15.

For transition nodes, mapping rule generator 30 adds element rule constructs which simply specify how to pass rule processing to their children in the context tree. For content nodes, the mapping rule generator adds specifications of the formatting object descriptions. For content transition nodes, it adds rule specifications for both content and transition functionality. For root and associated nodes, the mapping rule generator adds predefined and domain-specific presentation specifications. Particularly for the root node, the rule generator adds the specifications of defining an overall card-based presentation structure. For associated nodes, the mapping rule generator adds structure-specific association specifications. For instance, the structure-specific specifications can be related to hotspots, annotations, or animation objects associated with graphic objects.

Figure 16:
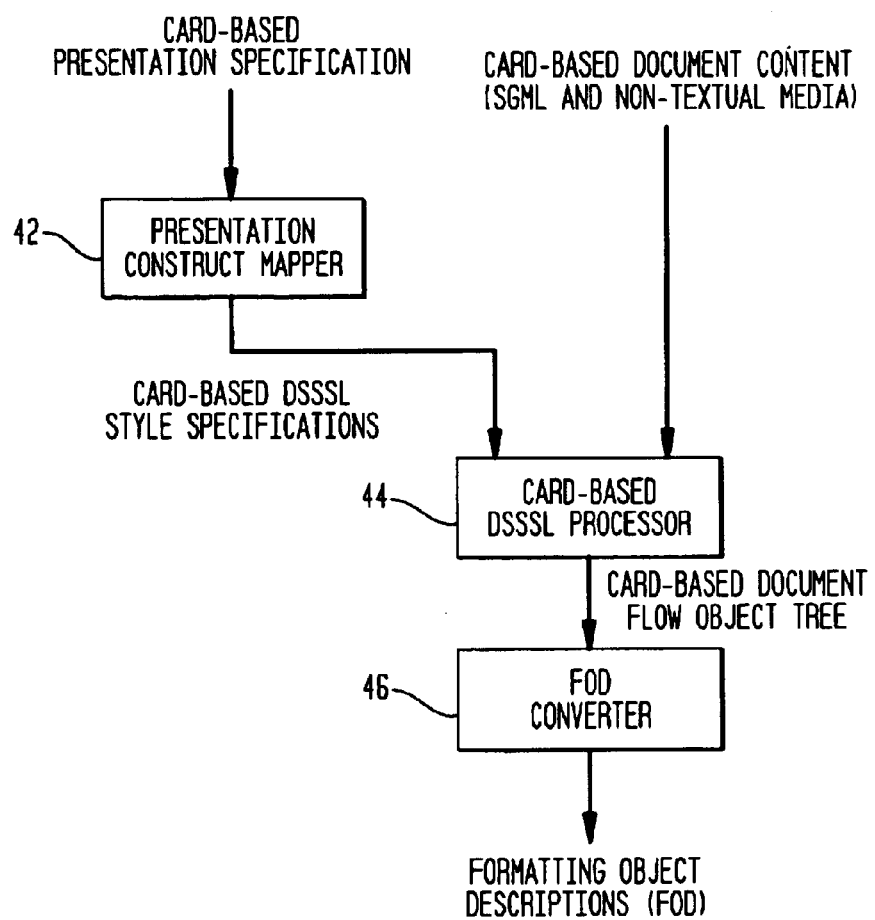
FIG. 16 illustrates a block diagram of a card-based presentation generator for translating card-based presentation specifications into structured formatting object descriptions.

Card-based document presentation generator (14 of FIG. 1) shown in FIG. 16 comprises the following components: presentation construct mapper 42, card-based DSSSL processor 44 and FOD convertor 46.

Presentation construct mapper 42 is used to map constructs in CPS into Card-based DSSSL constructs shown in FIGS. 17 and 18. The mapping procedure is a one-pass translation from CPS to a card-based DSSSL style specification as follows. Card-based DSSSL style specification uses the ISO standard document style language, called DSSSL (Document Style Semantics and Specification Language).

(1) Map CPS ElementRule context into card-based DSSSL element context.

(2) Map CPS CaseExpr and IfExpr into card-based DSSSL case and if functions.

(3) Map CPS MACRO_Declaration into card-based predefined DSSSL functions.

(4) Map CPS ProcessGrove into card-based DSSSL Process function.

(5) Map CPS DefineVar, AddObject and AddGroup into card-based DSSSL FODfo flow object instance.

This mapping process is very efficient, since CPS is designed to be as close to card-based DSSSL style specification as possible. In particular, the card-based DSSSL style specifications are based on one universal card-based presentation flow object, called FODfo, for creating the card-based document flow object tree as shown in FIG. 16. A card-based document flow object tree consists of a sequence of FODfo object instances. It is an abstract representation of card-based document formatting object descriptions. Using this single universal flow object can greatly simplify mapping of constructs from CPS to card-based DSSSL style specifications.

To create an instance of FODfo flow object, the mapper only needs to make a DSSSL function makeFODfo call, which takes three keyed arguments: FOtype, FOname and FOinstruction. FOinstruction is a data string that represents formatting information such as the presentation object attribute values. The key concept here is that FODfo flow object is designed in such a way that a complete card-based formatting object description can be composed by appending a sequence of FODfo object instances. Thus, a FOD can be created by a DSSSL predefined function sosofo-append (specification of sequence of flow object-append) to append all FODfo instances.

Card-based DSSSL processor 44 is used to create a card-based document flow object tree. This is an abstract representation of card-based document formatting descriptions and it comprises a sequence of FODfo flow objects. Each FODfo flow object contains an SGML data string of FOD and each FODfo flow object is designed for uniformly representing card-based formatting object information.

Finally, FOD converter 46 is used to convert this abstract representation of sequences of FODfo objects into FODs, i.e., formatting object descriptions, shown in FIGS. 19 and 20.

The card-based presentation specification is designed for bridging the gap between the declarative card layout style specification and the procedural card-based DSSSL style specification. These specifications can be automatically generated from card layout style specifications and can be used for automatically generating card-based DSSSL style specifications.

It is not intended that this invention be limited to the hardware or software arrangement or operational procedures shown disclosed. This invention includes all of the alterations and variations thereto as encompassed within the scope of the claims as follows.

What is claimed is:

1. A system for automatic generation of a card-based formatting object description, comprising:

a presentation style transformer for receiving a card display schema and a card layout style specification and for generating a card-based presentation specification, wherein said presentation style transformer comprises a resource generator for receiving said card layout style specification and said card display schema and providing presentation resource declarations of said card-based presentation specification, and a style proceduralizer for translating said card layout style specification into procedural card content mapping rules of said card-based presentation specification; and a card-based presentation generator connected to said presentation style transformer for receiving said card-based presentation specification and markup language document content and for providing an abstract description of formatting directives of a presentation document.

2. The system for automatic generation of said card-based formatting object description, as claimed in claim 1 wherein said style proceduralizer comprises:

a card-based context tree builder;

a content node path walker connected to said card-based context tree building; and a content mapping rule generator connected to said content node path walker.

3. The system for automatic generation of said card-based formatting object description, as claimed in claim 1 wherein said card based presentation generator comprises:

a presentation construct mapper;

a card-based Document Style Semantics and Specification Language (DSSSL) processor connected to said presentation construct mapper; and a Formatting Object Descriptions (FOD) converter connected to said card-based Document Style Semantic Language processor.

4. The system for automatic generation of said card-based formatting object description, as claimed in claim 1, wherein said card-based presentation generator further receives non-textual document content.

5. The system for automatic generation of said card-based formatting object description, as claimed in claim 1, wherein said abstract description of formatting directives of said presentation document comprises a sequence of formatting object description flow object instances.

6. A system for automatic generation of a card-based formatting object description, comprising:

presentation style transformer means for receiving a card layout style specification and a card display schema and for providing a card-based presentation specification, wherein said presentation style transformer means comprises resource generator means for receiving said card layout style specification and said card display schema and for providing presentation resource declarations of said card-based presentation specification, and style proceduralizer means for translating said card layout style specification into procedural card content mapping rules of said card-based presentation specification; and card-based presentation generator means connected to said presentation style transformer means for receiving said card-based presentation specification and markup language document content and for providing an abstract description of formatting directives of a presentation document.

7. The system for automatic generation of said card-based formatting object description, as claimed in claim 6 wherein said style proceduralizer means comprises:

card-based context tree builder means for receiving said card layout style specification and for providing a context tree;

content node path walker means connected to said card-based context tree builder means for receiving said context tree and for providing context paths; and content mapping rule generator means connected to said content node path walker means for receiving said context paths and said card display schema and for providing said card-based presentation specification.

8. The system for automatic generation of said card-based formatting object description, as claimed in claim 7 wherein said context tree captures content mapping rule context for making an efficient generation process of procedural rule mappings in Card-based Presentation Specification (CPS).

9. The system for automatic generation of said card-based formatting object description, as claimed in claim 6 wherein said card based presentation generator means comprises:

presentation construct mapper means for receiving said card-based presentation specification and for providing card-based Document Style Semantics and Specification Language (DSSSL) style specifications;

card-based Document Style Semantics and Specification Language (DSSSL) processor means connected to said presentation construct mapper means for receiving said card-based Document Style Semantics and Specification Language (DSSSL) style specifications and said markup language document content and for providing a card-based document flow object tree; and card-based Formatting Object Descriptions (FOD) converter means connected to said card-based Document Style Semantics and Specification Language (DSSSL) processor means for receiving said card-based document flow object tree and for providing said abstract description of formatting directives.

10. The system for automatic generation of said card-based formatting object description, as claimed in claim 9 wherein said card-based document flow object tree comprises:

a specification of a sequence of card-based Formatting Object Descriptions (FOD) flow objects.

11. The system for automatic generation of said card-based formatting object description, as claimed in claim 6, wherein said card-based presentation generator further receives non-textual document content.

12. The system for automatic generation of said card-based formatting object description, as claimed in claim 6, wherein said abstract description of formatting directives of said presentation document comprises a sequence of formatting object description flow object instances.

* * * * *

UNITED STATES PATENT AND TRADEMARK OFFICE
CERTIFICATE OF CORRECTION

PATENT NO.    : 6,865,714 B1
DATED         : March 8, 2005
INVENTOR(S)   : Peiya Liu et al.

It is certified that error appears in the above-identified patent and that said Letters Patent is hereby corrected as shown below:

Title page,
Item [75], Inventors, add -- Vivek Agrawala, Plainsboro, NJ (US) --.

Signed and Sealed this

Eleventh Day of October, 2005

JON W. DUDAS
*Director of the United States Patent and Trademark Office*